United States Patent
Facchin

[19]

[11] Patent Number: 6,038,734
[45] Date of Patent: Mar. 21, 2000

[54] BEARING CASTER

[76] Inventor: Girolamo Angelo Facchin, 102 Nobelius Drive, Legana, Tasmania, Australia, 7277

[21] Appl. No.: 09/082,680

[22] Filed: May 21, 1998

[51] Int. Cl.[7] .................................................. B60B 33/08
[52] U.S. Cl. .............................................. 16/24; 16/42 R
[58] Field of Search .................................. 16/24, 25, 26, 16/30, 42 R; 280/32.6, 47.34

[56] References Cited

U.S. PATENT DOCUMENTS

| | | | |
|---|---|---|---|
| D. 330,957 | 11/1992 | Contrini | D34/23 X |
| 356,483 | 1/1887 | Loos | 16/24 |
| 1,383,396 | 7/1921 | Friend . | |
| 1,686,896 | 10/1928 | Buckert et al. . | |
| 1,693,658 | 12/1928 | Noelting . | |
| 2,225,193 | 12/1940 | Benner et al. . | |
| 2,225,753 | 12/1940 | Milich | 16/26 |
| 2,782,045 | 2/1957 | Hulbert . | |
| 2,830,824 | 4/1958 | Young . | |
| 2,862,220 | 12/1958 | Orr . | |
| 3,031,207 | 4/1962 | Bard . | |
| 3,109,667 | 11/1963 | Wolner . | |
| 3,285,447 | 11/1966 | Junion . | |
| 3,399,903 | 9/1968 | Bailey . | |
| 4,119,044 | 10/1978 | Hines . | |
| 4,650,200 | 3/1987 | Berfield et al. | 280/47.26 X |
| 4,874,209 | 10/1989 | Spitzer et al. | 312/250 X |
| 5,088,751 | 2/1992 | Zint | 280/47.34 |
| 5,280,933 | 1/1994 | Finneyfrock | 280/47.34 |
| 5,378,003 | 1/1995 | Burd et al. | 280/32.6 |
| 5,379,485 | 1/1995 | Oshins et al. | 16/24 |
| 5,412,838 | 5/1995 | Yang | 16/26 |
| 5,479,677 | 1/1996 | Chong | 16/21 X |
| 5,524,916 | 6/1996 | Redens | 280/32.6 |
| 5,549,331 | 8/1996 | Yun et al. . | |
| 5,634,240 | 6/1997 | Brokaw | 16/30 |
| 5,758,888 | 6/1998 | Burgan et al. . | |
| 5,806,867 | 9/1998 | Hampton . | |
| 5,895,062 | 4/1999 | Miles et al. | 280/32.6 |
| 5,906,247 | 5/1999 | Inoue | 180/20 X |

*Primary Examiner*—Lynne H. Browne
*Assistant Examiner*—Brian H. Buck

[57] ABSTRACT

A bearing caster for resting heavy objects thereon for permitting easy movement of the object. The inventive device includes a body with a pad provided on the top of the body. A plurality of rolling balls are rotationally mounted to the bottom (14) of the base to permit free rotation of the rolling balls.

10 Claims, 3 Drawing Sheets

BEARING CASTER

BACKGROUND OF THE INVENTION

1. Field of the Invention

The present invention relates to ground engaging members and devices and more particularly pertains to a new bearing caster for resting heavy objects thereon for permitting easy movement of the object.

2. Description of the Prior Art

The use of ground engaging members and devices is known in the prior art. More specifically, ground engaging members and devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art ground engaging members and devices include U.S. Pat. No. 4,822,066; U.S. Pat. No. 5,074,572; U.S. Pat. No. 4,824,129; U.S. Pat. No. Des. 335,374; U.S. Pat. No. Des. 349,995; and U.S. Pat. No. 5,028,062.

While these devices fulfill their respective, particular objectives and requirements, the aforementioned patents do not disclose a new bearing caster. The inventive device includes a body with a pad provided on the top of the body. A plurality of rolling balls are rotationally mounted to the bottom 14 of the base to permit free rotation of the rolling balls.

In these respects, the bearing caster according to the present invention substantially departs from the conventional concepts and designs of the prior art, and in so doing provides an apparatus primarily developed for the purpose of resting heavy objects thereon for permitting easy movement of the object.

SUMMARY OF THE INVENTION

In view of the foregoing disadvantages inherent in the known types of ground engaging members and devices now present in the prior art, the present invention provides a new bearing caster construction wherein the same can be utilized for resting heavy objects thereon for permitting easy movement of the object.

The general purpose of the present invention, which will be described subsequently in greater detail, is to provide a new bearing caster apparatus and method which has many of the advantages of the ground engaging members and devices mentioned heretofore and many novel features that result in a new bearing caster which is not anticipated, rendered obvious, suggested, or even implied by any of the prior art ground engaging members and devices, either alone or in any combination thereof.

To attain this, the present invention generally comprises a body with a pad provided on the top of the body. A plurality of rolling balls are rotationally mounted to the bottom 14 of the base to permit free rotation of the rolling balls.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new bearing caster apparatus and method which has many of the advantages of the ground engaging members and devices mentioned heretofore and many novel features that result in a new bearing caster which is not anticipated, rendered obvious, suggested, or even implied by any of the prior art ground engaging members and devices, either alone or in any combination thereof.

It is another object of the present invention to provide a new bearing caster which may be easily and efficiently manufactured and marketed.

It is a further object of the present invention to provide a new bearing caster which is of a durable and reliable construction.

An even further object of the present invention is to provide a new bearing caster which is susceptible of a low cost of manufacture with regard to both materials and labor, and which accordingly is then susceptible of low prices of sale to the consuming public, thereby making such bearing caster economically available to the buying public.

Still yet another object of the present invention is to provide a new bearing caster which provides in the apparatuses and methods of the prior art some of the advantages thereof, while simultaneously overcoming some of the disadvantages normally associated therewith.

Still another object of the present invention is to provide a new bearing caster for resting heavy objects thereon for permitting easy movement of the object.

Yet another object of the present invention is to provide a new bearing caster which includes a body with a pad provided on the top of the body. A plurality of rolling balls are rotationally mounted to the bottom 14 of the base to permit free rotation of the rolling balls.

Still yet another object of the present invention is to provide a new bearing caster that provides a stable base for an object that permits rolling of the object over a ground surface.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
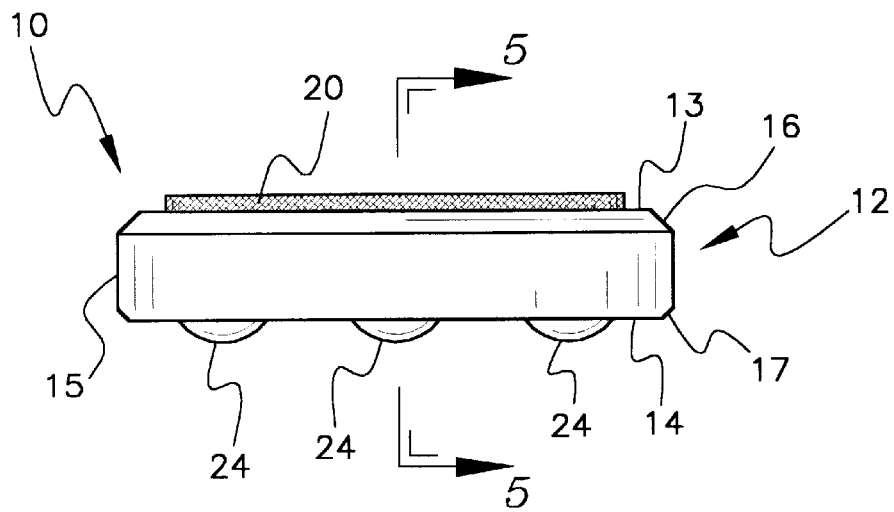
FIG. 1 is a schematic side view of a new bearing caster according to the present invention.
Figure 2:
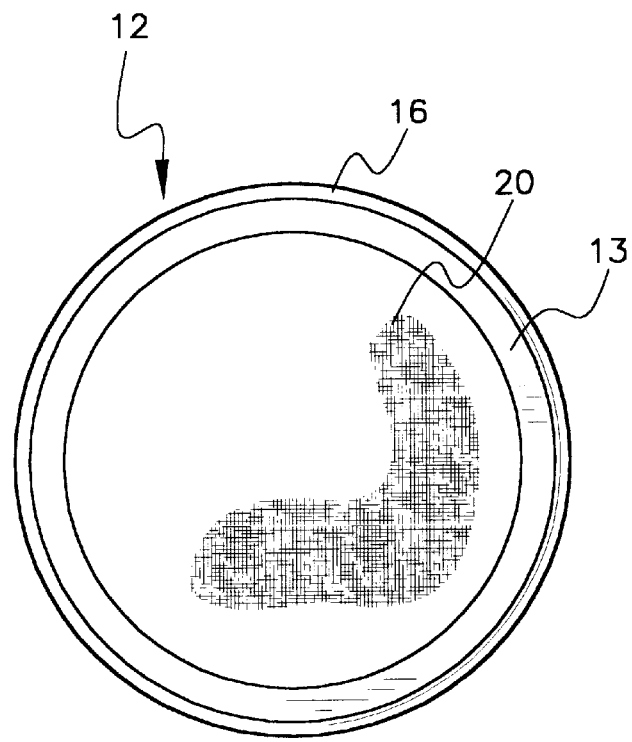
FIG. 2 is a schematic top side view of the present invention.

With reference now to the drawings, and in particular to FIGS. 1 through 6 thereof, a new bearing caster embodying the principles and concepts of the present invention and generally designated by the reference numeral 10 will be described.

As best illustrated in FIGS. 1 through 6, the bearing caster 10 generally comprises a body 12 with a pad 20 provided on the top 13 of the body 12. A plurality of rolling balls 24 are rotationally mounted to the bottom 14 of the base to permit free rotation of the rolling balls 24.

Figure 3:
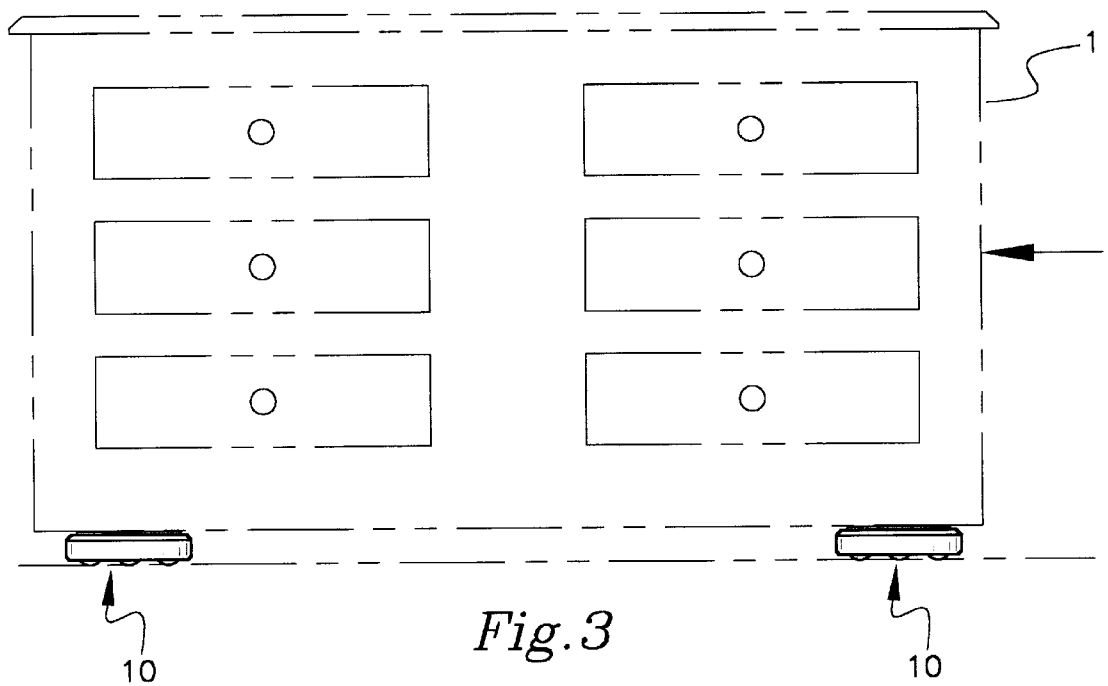
FIG. 3 is a schematic side view of the present invention in use.
Figure 4:
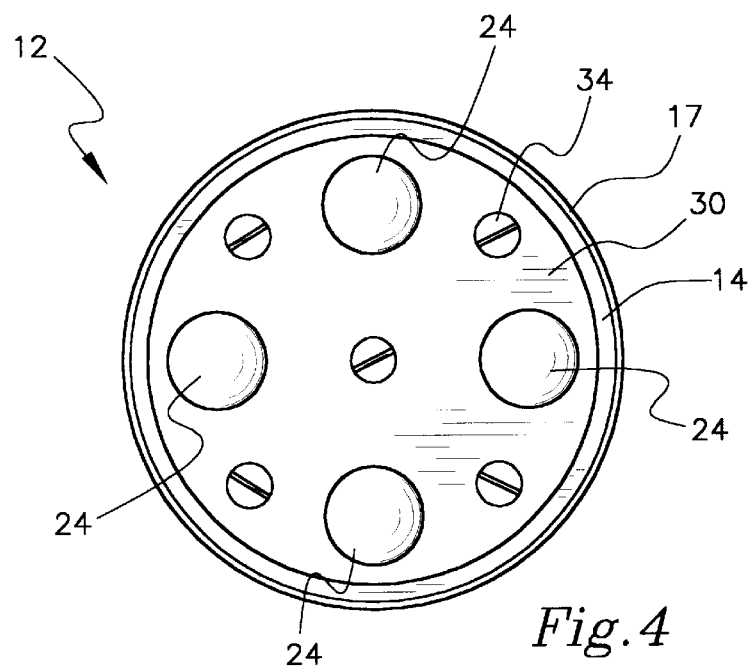
FIG. 4 is a schematic bottom side view of the present invention.

With reference to FIG. 3, in use the device 10 is designed for resting an object 1 thereon. In closer detail, the bearing caster 10 includes a body 12 which is generally disk-shaped and has a top 13, a bottom 14, and a perimeter side 15. In an ideal illustrative embodiment, the body 12 has a diameter less than about 50 mm and a thickness defined between the top 13 and bottom 14 of the body 12 of less than about 10 mm. The body 12 has a top edge 16 defined between the top 13 of the body 12 and the perimeter side 15 of the body 12. Preferably, the top edge 16 is beveled, ideally, at a 45 degree angle to the top 13 and the perimeter side 15 of the body 12 and with a width between the top 13 and perimeter side 15 of less than 2 mm. Similarly, the body 12 has a bottom edge 17 defined between the bottom 14 of the body 12 and the perimeter side 15 of the body 12. Like the top edge, ideally, the bottom edge 17 is beveled at a 45 degree angle to the top and the perimeter side 15 of the body 12 with a width between the top and perimeter side 15 of less then 1 mm.

Figure 5:
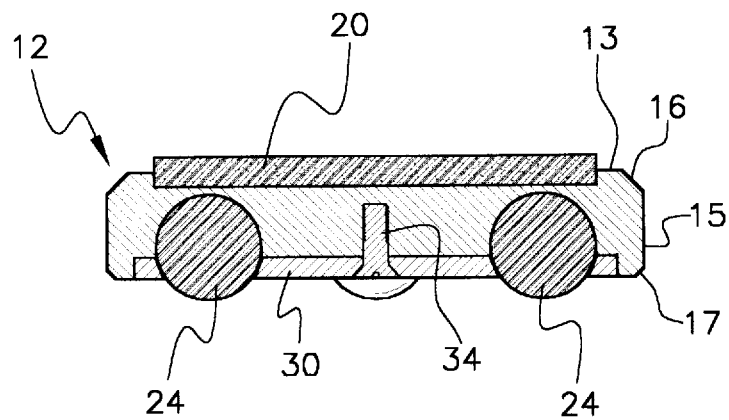
FIG. 5 is a schematic cross sectional view of the present invention taken from line 5—5 of FIG. 1.
Figure 6:
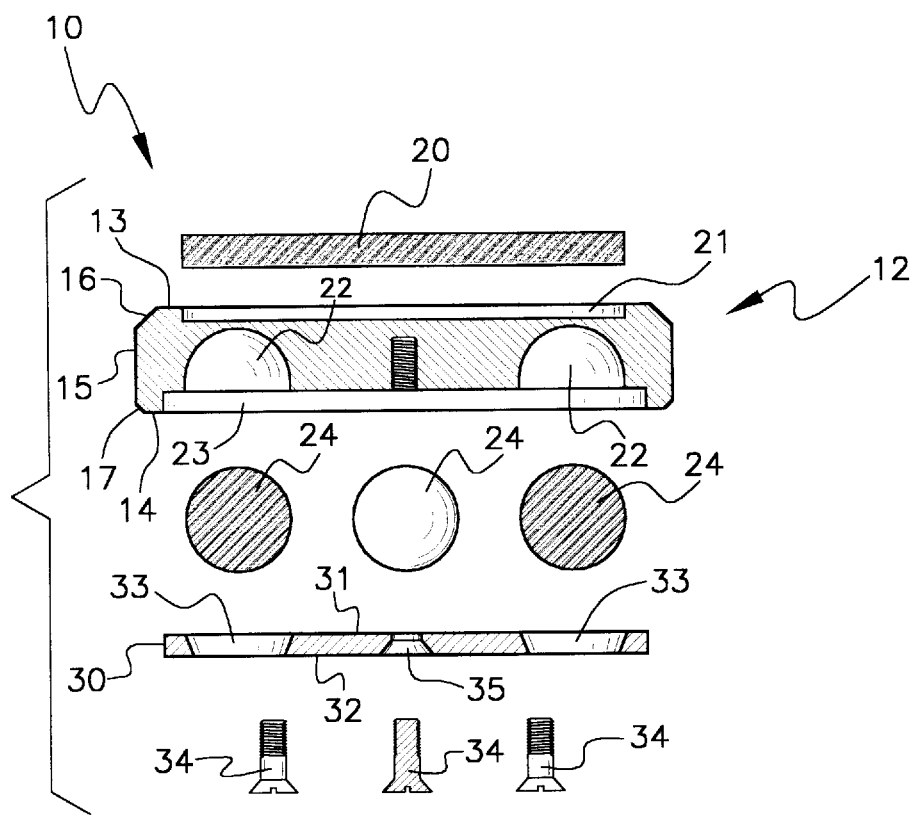
FIG. 6 is a schematic exploded view of the cross section of FIG. 5.

A pad 20 is provided on the top 13 of the body 12. The pad 20 is generally disc shaped and is designed for resting an object 1 thereon. Ideally, the pad 20 comprises rubber or plastic with a frictionally enhanced surface for preventing sliding of objects resting thereon. In the ideal illustrative embodiment, the pad 20 has a diameter of less than about 42 mm. As illustrated in FIG. 6, the top 13 of the body 12 preferably has a top recess 21 with a generally circular periphery. Preferably, the center the top recess 21 is coaxial with the center of the body 12 such that the top recess 21 is centered on the top 13 of the body 12. As illustrated in FIG. 5, the pad 20 is disposed in the top recess 21 such that the top surface 31 of the pad 20 extends above the top 13 of the body 12.

The bottom 14 of the body 12 has a plurality of spaced apart generally hemispherical cavities 22 therein. Preferably, the cavities 22 are equidistantly spaced apart from one another with the center of each cavity 22 equidistantly spaced from the center of the body 12. In the ideal illustrative embodiment, the cavities 22 each have a diameter of less than about 10.2 mm, that is, a radius of less than about 5.1 mm. In this embodiment, the cavities 22 preferably have a depth measured from the bottom 14 of the body 12 of less than about 8 mm. As illustrated in FIG. 6, the bottom 14 of the body 12 preferably has a bottom recess 23 with the cavities 22 of the bottom 14 of the body 12 opening into the bottom recess 23. The bottom recess 23 preferably has a generally circular periphery and, like the top recess, the center the bottom recess 23 is preferably, coaxial with the center of the body 12 such that the bottom recess 23 is centered on the bottom 14 of the body 12. In the ideal illustrative embodiment, the bottom recess 23 has a diameter of between about 46.1 mm and 46.3 mm and a depth of less than about 2 mm such that the depth of the cavities 22 as measured from the bottom recess 23 is less than about 6 mm.

A plurality of generally spherical rolling balls 24 rotationally mounted to the bottom 14 of the base to permit free rotation of the rolling balls 24. As shown in FIG. 5, each of the cavities 22 has a rolling ball 24 disposed therein such that a portion of the rolling ball 24 extends outwardly from the bottom 14 of the body 12 with the rolling balls 24 rotatable in their associated cavity 22 to permit rolling on a ground surface.

The device 10 also includes a preferably generally circular base plate 30. The base plate has top and bottom surfaces 31,32, and a plurality of circular holes 33 therethrough. Each of the holes 33 of the base plate 30 is associated with a corresponding cavity 22 of the bottom 14 of the body 12. The base plate 30 is coupled to the bottom 14 of the body 12 such that each hole 33 of the base plate 30 is positioned coaxially adjacent to the associated cavity 22 of the body 12. Ideally, the base plate 30 is coupled to the bottom 14 of the body 12 by fasteners 34 extended through apertures 35 in the base plate 30. Preferably, the base plate 30 is disposed in the bottom recess 23 of the bottom 14 of the body 12 with a portion of each of the rolling balls 24 in the cavities 22 extending through the associated hole 33 of the base plate 30 such that the portion outwardly extends from the bottom surface 32 of the base plate 30. In the ideal illustrative embodiment, the base plate 30 has a diameter of between about 45.8 mm and 46 mm and an ideal thickness defined between the top and bottom surfaces 31,32 of the base plate 30 of less than about 2 mm.

As best depicted in FIG. 6, the periphery of each of the holes 33 is tapered radially inwards from the top surface 31 of the base plate 30 to the bottom surface 32 of the base plate 30 such that the diameter of each hole 33 at the top surface 31 of the base plate 30 is greater than the diameter of the associated hole 33 at side bottom surface 32 of the base plate 30. In the illustrative embodiment, the top surface 31 diameter of each hole 33 is less than about 10.2 mm and the bottom surface 32 diameter of each hole 33 is less than about 8.5 mm.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A ground engaging device for resting an object thereon, said ground engaging device comprising:

a body having a top, a bottom, and a perimeter side, said bottom of said body having a plurality of cavities therein, said cavities being generally hemispherical, each of said cavities having a rolling ball disposed therein such that a portion of the rolling ball extends outwardly from said bottom of said body;

a pad being provided on said top of said body;

a base plate having top and bottom surfaces, and a plurality of circular holes therethrough, each said hole of said base plate being associated with a cavity of said bottom of said body, said base plate being coupled to said bottom of said body such that each hole of said base plate is positioned coaxially adjacent to the associated cavity of said body, a portion of said rolling balls in said cavities being extended through the associated hole of said base plate such that said portion outwardly extends from said bottom surface of said base plate, each of said holes of said base plate has a periphery, said periphery of each of said holes being tapered radially inwards from said top surface of said base plate to said bottom surface of said base plate such that the diameter of each hole at said top surface of said base plate is greater than the diameter of the hole at said bottom surface of said base plate; and wherein said top of said body has a top recess, said pad being disposed in said top recess.

2. The ground engaging device of claim 1, wherein said body is generally disk-shaped, and said pad is generally disk shaped.

3. The ground engaging device of claim 1, wherein said body has a top edge defined between said top of said body and said perimeter side of said body, wherein said top edge is beveled, wherein said body has a bottom edge defined between said bottom of said body and said perimeter side of said body, and wherein said bottom edge is beveled.

4. The ground engaging device of claim 1, wherein said cavities are equidistantly spaced apart from one another.

5. The ground engaging device of claim 1, wherein said bottom of said body has a bottom recess, said cavities of said bottom of said body opening into said bottom recess, said base plate being disposed in said bottom recess of said bottom of said body.

6. A ground engaging device for resting an object thereon, said ground engaging device comprising:

a body being generally disk-shaped and having a top, a bottom, and a perimeter side;

said body having a top edge defined between said top of said body and said perimeter side of said body, wherein said top edge is beveled;

said body having a bottom edge defined between said bottom of said body and said perimeter side of said body, wherein said bottom edge is beveled;

wherein said body has a center and a diameter, wherein said diameter of said body is less than about 50 mm;

wherein said body has a thickness defined between said top and bottom of said body of less than about 10 mm;

a pad being provided on said top of said body, said pad being generally disc shaped;

said pad having a diameter, said diameter of said pad being less than about 42 mm;

said top of said body having a top recess, said top recess having a generally circular periphery, said top recess being coaxial with said center of said body, said pad being disposed in said top recess;

said bottom of said body having a plurality of cavities therein, said cavities being generally hemispherical, said cavities being equidistantly spaced apart from one another, each of said cavities being equidistantly spaced from said center of said body;

said bottom of said body having a bottom recess, said bottom recess having a generally circular periphery, said bottom recess being coaxial with said center of said body, said cavities of said bottom of said body opening into said bottom recess;

a plurality of rolling balls, each of said cavities having a rolling ball disposed therein such that a portion of the rolling ball extends outwardly from said bottom of said body;

a base plate being generally circular and having top and bottom surfaces, and a plurality of circular holes therethrough, each said hole of said base plate being associated with a cavity of said bottom of said body, said base plate being coupled to said bottom of said body such that each hole of said base plate is positioned coaxially adjacent to the associated cavity of said body, said base plate being disposed in said bottom recess of said bottom of said body;

a portion of each of said rolling balls in said cavities being extended through the associated hole of said base plate such that said portion outwardly extends from said bottom surface of said base plate; and each of said holes of said base plate having a periphery, said periphery of each of said holes being tapered radially inwards from said top surface of said base plate to said bottom surface of said base plate such that the diameter of each hole at said top surface of said base plate is greater than the diameter of the hole at said bottom surface of said base plate.

7. A ground engaging device for resting an object thereon, said ground engaging device comprising:

a body having a top, a bottom, and a perimeter side;

a pad being provided on said top of said body;

a plurality of rolling balls rotationally mounted to said bottom of said body to permit free rotation of said rolling balls;

wherein said bottom of said body has a plurality of cavities therein, said cavities being generally hemispherical, each of said cavities having a rolling ball disposed therein such that a portion of the rolling ball extends outwardly from said bottom of said body;

a base plate having top and bottom surfaces, and a plurality of circular holes therethrough, each said hole of said base plate being associated with a cavity of said bottom of said body, said base plate being coupled to said bottom of said body such that each hole of said base plate is positioned coaxially adjacent to the associated cavity of said body, a portion of each of said rolling balls in said cavities being extended through the associated hole of said base plate such that said portion outwardly extends from said bottom surface of said base plate;

wherein said bottom of said body has a bottom recess, said cavities of said bottom of said body opening into said bottom recess, said base plate being disposed in said bottom recess of said bottom of said body; and wherein each of said holes of said base plate has a periphery, said periphery of each of said holes being tapered radially inwards from said top surface of said base plate to said bottom surface of said base plate such that the diameter of each hole at said top surface of said base plate is greater than the diameter of the hole at said bottom surface of said base plate.

8. The ground engaging device of claim 7, wherein said body is generally disk-shaped, and said pad is generally disk shaped.

9. The ground engaging device of claim 7, wherein said body has a top edge defined between said top of said body and said perimeter side of said body, wherein said top edge is beveled, wherein said body has a bottom edge defined between said bottom of said body and said perimeter side of said body, and wherein said bottom edge is beveled.

10. The ground engaging device of claim 7, wherein said top of said body has a top recess, said pad being disposed in said top recess.

* * * * *